United States Patent
Kasahara et al.

(10) Patent No.: US 11,919,548 B2
(45) Date of Patent: Mar. 5, 2024

(54) DRIVING ASSISTANCE DEVICE, DRIVING ASSISTANCE SYSTEM, DRIVING ASSISTANCE METHOD, AND NON-TRANSITORY COMPTER-READABLE RECORDING MEDIUM

(71) Applicant: JVCKENWOOD Corporation, Yokohama (JP)

(72) Inventors: Ryuji Kasahara, Yokohama (JP); Noriyuki Nakazawa, Yokohama (JP); Hitoshi Sunohara, Yokohama (JP); Katsuyuki Nagai, Yokohama (JP)

(73) Assignee: JVCKENWOOD Corporation, Yokohama (JP)

(*) Notice: Subject to any disclaimer, the term of this patent is extended or adjusted under 35 U.S.C. 154(b) by 262 days.

(21) Appl. No.: 17/400,175

(22) Filed: Aug. 12, 2021

(65) Prior Publication Data

US 2021/0370982 A1 Dec. 2, 2021

Related U.S. Application Data

(63) Continuation of application No. PCT/JP2019/044856, filed on Nov. 15, 2019.

(30) Foreign Application Priority Data

Feb. 25, 2019 (JP) .................. 2019-031571

(51) Int. Cl.
*B60W 60/00* (2020.01)
*B60W 50/14* (2020.01)
(Continued)

(52) U.S. Cl.
CPC ........ *B60W 60/0055* (2020.02); *B60W 50/14* (2013.01); *G05D 1/0061* (2013.01);
(Continued)

(58) Field of Classification Search
CPC ............ B60W 60/0055; B60W 50/14; B60W 2552/05; B60W 2554/4041;
(Continued)

(56) References Cited

U.S. PATENT DOCUMENTS

2016/0210850 A1 7/2016 Urano
2017/0151945 A1 6/2017 Torii
(Continued)

FOREIGN PATENT DOCUMENTS

EP 3381758 10/2018
JP 2015044432 A * 3/2015
(Continued)

OTHER PUBLICATIONS

International Search Report and Written Opinion for International Application No. PCT/JP2019/044856 dated Dec. 10, 2019, 10 pages.

*Primary Examiner* — Rodney A Butler

(74) *Attorney, Agent, or Firm* — Amin, Turocy & Watson, LLP

(57) ABSTRACT

A driving assistance device is the driving assistance device used in a vehicle capable of switching between autonomous driving and driving that requires operation by the driver, and includes a different vehicle information acquisition unit that acquires autonomous driving information on different vehicles on a traveling road of the vehicle, an autonomous driving ratio acquisition unit that acquires a ratio of autonomous driving in the different vehicles from the autonomous driving information on the different vehicles acquired by the different vehicle information acquisition unit, and a notification control unit that provides information for supporting determination on switching between autonomous driving and driving that requires operation by a driver if the ratio of
(Continued)

autonomous driving in the different vehicles is equal to or larger than a predetermined ratio.

7 Claims, 8 Drawing Sheets

(51) Int. Cl.
  *G05D 1/00* (2006.01)
  *G05D 1/02* (2020.01)
  *G08G 1/09* (2006.01)
  *G08G 1/0967* (2006.01)

(52) U.S. Cl.
  CPC ......... *G05D 1/0276* (2013.01); *G05D 1/0287* (2013.01); *G08G 1/096791* (2013.01); *B60W 2552/05* (2020.02); *B60W 2554/4041* (2020.02); *B60W 2554/4044* (2020.02); *B60W 2556/65* (2020.02)

(58) Field of Classification Search
  CPC ..... B60W 2554/4044; B60W 2556/65; B60W 2556/45; B60W 60/0051; G05D 1/0061; G05D 1/0276; G05D 1/0287; G08G 1/096791; G08G 1/096716
  See application file for complete search history.

(56) References Cited

U.S. PATENT DOCUMENTS

| | | | |
|---|---|---|---|
| 2018/0137751 A1 | 5/2018 | Urano | |
| 2018/0312161 A1 | 11/2018 | Asakura et al. | |
| 2019/0061775 A1* | 2/2019 | Emura | G08G 1/16 |
| 2019/0304309 A1 | 10/2019 | Sakamoto et al. | |

FOREIGN PATENT DOCUMENTS

| | | |
|---|---|---|
| JP | 2016-133379 | 7/2016 |
| JP | 2017-102556 | 6/2017 |
| JP | 2018-077652 | 5/2018 |
| JP | 2018-101199 | 6/2018 |
| JP | 2018-181120 | 11/2018 |
| WO | 2017/077807 | 5/2017 |

* cited by examiner

DRIVING ASSISTANCE DEVICE, DRIVING ASSISTANCE SYSTEM, DRIVING ASSISTANCE METHOD, AND NON-TRANSITORY COMPTER-READABLE RECORDING MEDIUM

CROSS-REFERENCE TO RELATED APPLICATION

This application is a Continuation of PCT International Application No. PCT/JP2019/044856 filed on Nov. 15, 2019 which claims the benefit of priority from Japanese Patent Application No. 2019-031571 filed on Feb. 25, 2019, the entire contents of which are incorporated herein by reference.

BACKGROUND OF THE INVENTION

1. Field of the Invention

The present invention relates to a driving assistance device, a driving assistance system, a driving assistance method, and a program.

2. Description of the Related Art

There is known a technique for selectively performing autonomous driving and driving that requires operation by a driver in a vehicle. A technique for controlling autonomous driving of a different vehicle or the like on the basis of information on a driving situation and details of control on autonomous driving of a subject vehicle and information on a driving situation and details of control on autonomous driving acquired from the different vehicle or the like has been known (for example, JP 2018-077652 A).

The autonomous driving and the driving that requires operation by a driver are switched from one to the other based on a determination made by the driver. For example, even if the driver determines that driving that requires operation by the driver is to be performed, in some cases, it may be better to switch to autonomous driving to improve safety, depending on surrounding situations. Furthermore, for example, even if the driver determines that autonomous driving is to be performed, it may be better not to perform autonomous driving to improve safety, depending on surrounding situations. Therefore, there is a need to assist the driver in making an appropriate determination.

SUMMARY OF THE INVENTION

A driving assistance device according to an embodiment is used in a vehicle capable of switching between autonomous driving and driving that requires operation by a driver. The driving assistance device includes a different vehicle information acquisition unit that acquires autonomous driving information on different vehicles that travel on a traveling road of the vehicle; an autonomous driving ratio acquisition unit that acquires a ratio of autonomous driving in the different vehicles from the autonomous driving information on the different vehicles acquired by the different vehicle information acquisition unit; and a notification control unit that provides information for supporting determination on switching between autonomous driving and driving that requires operation by a driver, in accordance with the ratio of autonomous driving in the different vehicles.

A driving assistance system according to an embodiment includes a driving assistance device that is used in a vehicle capable of switching between autonomous driving and driving that requires operation by a driver; and, an external device capable of performing communication with the driving assistance device. The external device includes a different vehicle information acquisition unit that acquires autonomous driving information on different vehicles on the basis of location information on the vehicle; and an autonomous driving ratio acquisition unit that acquires a ratio of autonomous driving performed in the different vehicles from the autonomous driving information on the different vehicles acquired by the different vehicle information acquisition unit. The driving assistance device includes a notification control unit that provides information for supporting determination on switching between autonomous driving and driving that requires operation by a driver, in accordance with the ratio of autonomous driving in the different vehicles.

A driving assistance method according to an embodiment is performed by a vehicle capable of switching between autonomous driving and driving that requires operation by a driver. The driving assistance method includes a different vehicle information acquisition step of acquiring autonomous driving information on different vehicles that travel on a traveling road of the vehicle; a ratio of autonomous driving acquisition step of acquiring a ratio of autonomous driving performed in the different vehicles from the autonomous driving information on the different vehicles acquired at the different vehicle information acquisition step; and a notification control step of providing information for supporting determination on switching between autonomous driving and driving that requires operation by the driver, in accordance with the ratio of autonomous driving in the different vehicles.

A non-transitory computer-readable recording medium according to an embodiment contains a computer program to be executed by a computer that operates as a driving assistance device of a vehicle capable of switching between autonomous driving and driving that requires operation by a driver. The computer program causes the computer to execute a different vehicle information acquisition step of acquiring autonomous driving information on different vehicles that travel on a traveling road of the vehicle; a ratio of autonomous driving acquisition step of acquiring a ratio of autonomous driving performed in the different vehicles from the autonomous driving information on the different vehicles acquired at the different vehicle information acquisition step; and a notification control step of providing information for supporting determination on switching between autonomous driving and driving that requires operation by the driver, in accordance with the ratio of autonomous driving in the different vehicles.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a driving assistance device 10, a driving assistance method, and a program according to the present embodiments will be described in detail below with reference to the accompanying drawings. The present invention is not limited by the embodiments below.

First Embodiment

Figure 1:
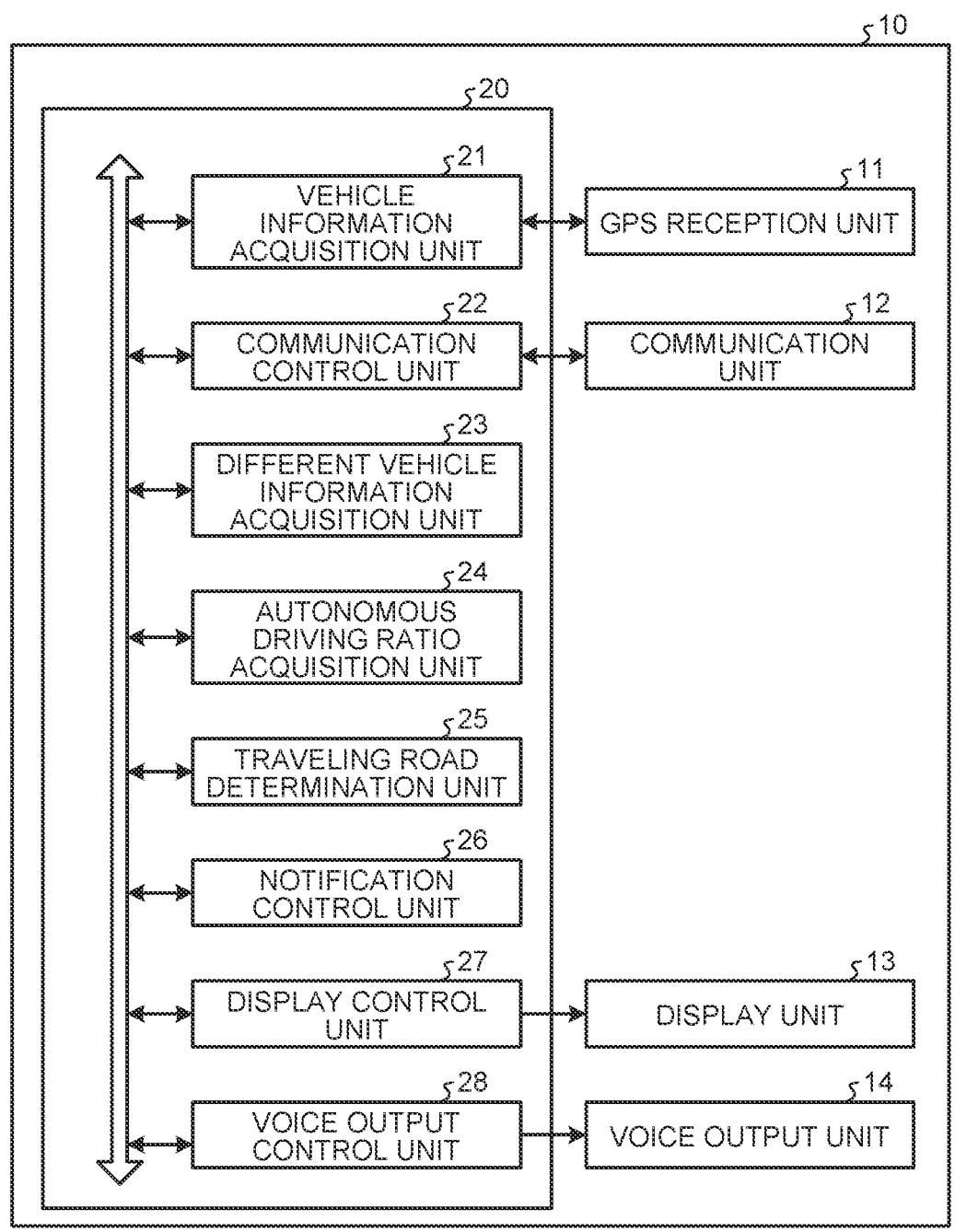
FIG. 1 is a block diagram illustrating a configuration example of a driving assistance device according to a first embodiment.

FIG. 1 is a block diagram illustrating a configuration example of a driving assistance device according to a first embodiment. The driving assistance device 10 is used in a vehicle that is able to switch between autonomous driving and driving that requires operation by a driver. The driving assistance device 10 may be installed in a vehicle, or may be a portable device that is available in a vehicle.

As for the autonomous driving, whether a subject that drives the vehicle is a driver or the vehicle, in other words, a degree of autonomous driving, is defined by an autonomous driving level.

At generally-defined autonomous driving level 3, conditional autonomous driving is performed. More specifically, at autonomous driving level 3, a system performs all kinds of control related to driving. At autonomous driving level 3, if the driver is requested by the system to intervene the driving, the driver needs to cope with it. At autonomous driving level 3, the system monitors a traveling state of the vehicle. The present embodiment is applied to a vehicle that switches between autonomous driving and driving that requires operation by a driver in accordance with conditions, similarly to autonomous driving level 3.

The driving assistance device 10 will be described. The driving assistance device 10 notifies a driver of information for supporting determination on switching between autonomous driving and driving that requires operation by the driver. The driving assistance device 10 includes a global positioning system (GPS) reception unit 11, a communication unit 12, a display unit 13, a voice output unit 14, and a control device (driving assistance control device) 20. It is sufficient that at least one of the display unit 13 and the voice output unit 14 is included. In the present embodiment, it is assumed that the display unit 13 and the voice output unit 14 are included.

The GPS reception unit 11 receives radio waves from GPS satellites (not illustrated). The GPS reception unit 11 outputs signals of the received radio waves to a vehicle information acquisition unit 21 of the control device 20.

The communication unit 12 is a communication unit. The communication unit 12 may perform communication through any method, such as the Internet or a mobile phone line. The communication unit 12 is able to acquire different vehicle information by performing vehicle-to-vehicle communication with a different vehicle located around the vehicle.

The display unit 13 is a display including, for example, a liquid crystal display (LCD), an organic electro-luminescence (EL) display, or a head-up display. The display unit 13 displays a video based on a video signal that is output from a display control unit 27 of the control device 20. The display unit 13 may be dedicated to the driving assistance device 10 or may be shared with other systems including, for example, a navigation system. The display unit 13 is arranged at a position that can easily be viewed by the driver.

The voice output unit 14 is, as one example, a voice output device that is shared with other systems including a navigation system. The voice output unit 14 outputs a voice signal that is output from a voice output control unit 28 of the control device 20.

The control device 20 is, for example, an arithmetic processing device that includes a central processing unit (CPU), a video processing processor, or the like. The control device 20 loads a program stored in an internal memory or the like onto a memory, and executes commands included in the program. The control device 20 includes the vehicle information acquisition unit 21, a communication control unit 22, a different vehicle information acquisition unit 23, an autonomous driving ratio acquisition unit 24, a traveling road determination unit 25, a notification control unit 26, the display control unit 27, and the voice output control unit 28. The structural elements as described above are implemented by causing the control device 20 to execute a program. The control device 20 includes an internal memory (not illustrated), and the internal memory is used to temporarily store therein data or the like in the control device 20. The control device 20 may be configured with a single or a plurality of devices.

The vehicle information acquisition unit 21 acquires information that makes it possible to determine whether the vehicle is performing autonomous driving, from a control device included in the vehicle via a controller area network (CAN) interface or the like. The vehicle information acquisition unit 21 acquires location information on the vehicle acquired by using the GPS reception unit 11. The vehicle information acquisition unit 21 outputs the acquired location information to the autonomous driving ratio acquisition unit 24.

The communication control unit 22 controls communication performed by the communication unit 12.

The different vehicle information acquisition unit 23 acquires autonomous driving information on a different vehicle that is traveling on a traveling road of the vehicle. More specifically, the different vehicle information acquisition unit 23 acquires the autonomous driving information on the different vehicle on the traveling road on which the vehicle is traveling. The different vehicle information acquisition unit 23 acquires location information on the different vehicle that is traveling on the traveling road of the vehicle, together with the autonomous driving information on the different vehicle. In the present embodiment, information on different vehicles that travel around the vehicle, for example, within about several hundred meters from the vehicle, on the traveling road.

Figure 2:
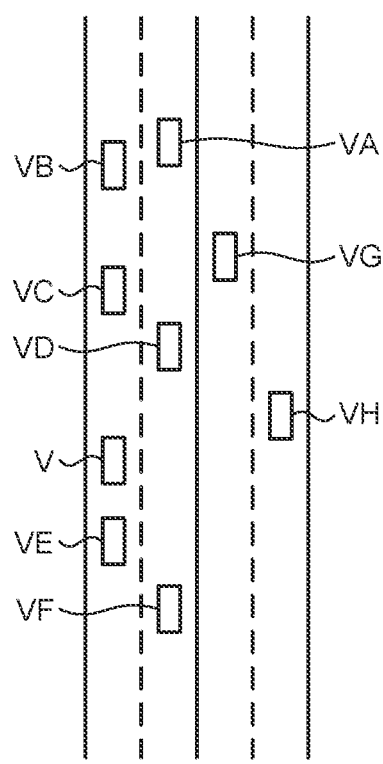
FIG. 2 is a diagram for explaining a vehicle and different vehicles.

The vehicle and the different vehicles will be described with reference to FIG. 2. FIG. 2 is a diagram for explaining the vehicle and the different vehicles. On a four-lane traveling road on which the vehicle V is traveling, different vehicles VA to VH are traveling around the vehicle V. The different vehicles VA to VF are traveling in the same traveling direction. The different vehicles VA to VD are traveling in front of the vehicle V in the same traveling direction. The different vehicle VG and the different vehicle VH are traveling in an opposite direction in opposite lanes.

The autonomous driving ratio acquisition unit 24 acquires a ratio of autonomous driving performed in the different vehicles from the autonomous driving information on the different vehicles acquired by the different vehicle information acquisition unit 23. More specifically, the autonomous driving ratio acquisition unit 24 acquires the ratio of autonomous driving performed in the different vehicles from the autonomous driving information on the different vehicles on the traveling road on which the vehicle is traveling, where the autonomous driving information is acquired by the different vehicle information acquisition unit 23. For example, the autonomous driving ratio acquisition unit 24 acquires a ratio of different vehicles that are performing autonomous driving among the different vehicles that are located within a radius of several hundred meters from the vehicle.

The autonomous driving ratio acquisition unit 24 may acquire a ratio of autonomous driving performed in different vehicles that travel in the same traveling direction as the vehicle from the autonomous driving information on the different vehicles on the traveling road on which the vehicle is traveling. Further, the autonomous driving ratio acquisition unit 24 may acquire a ratio of autonomous driving performed in different vehicles that travel in front of the vehicle in the same traveling direction as the vehicle from the autonomous driving information on the different vehicles on the traveling road on which the vehicle is traveling.

The traveling road determination unit 25 determines whether a traveling road indicated by the location information on the vehicle is a traveling road on which the autonomous driving is possible, on the basis of the information acquired by the vehicle information acquisition unit 21. The traveling road determination unit 25 determines whether the autonomous driving is possible on the traveling road indicated by the location information on the vehicle, on the basis of information obtained from a map information database or road-to-vehicle communication, in addition to the location information on the vehicle, for example.

The notification control unit 26 performs control of providing information for supporting determination on switching between autonomous driving and driving that requires operation by the driver, in accordance with the ratio of autonomous driving in the different vehicles on the traveling road on which the vehicle is traveling, where the ratio is acquired by the autonomous driving ratio acquisition unit 24. More specifically, if the ratio of autonomous driving in the different vehicles is equal to or larger than a predetermined ratio, the notification control unit 26 gives a notice of recommendation for switching to the autonomous driving. If the ratio of autonomous driving in the different vehicles is not equal to or larger than the predetermined ratio, the notification control unit 26 does not give a notice of recommendation for switching to the autonomous driving.

The notification control unit 26 may give a notice of recommendation for switching to the autonomous driving if a target traveling road is a traveling road on which the vehicle is allowed to perform the autonomous driving.

The notification control unit 26 may give a notice of recommendation for switching to the autonomous driving if the ratio of autonomous driving in the different vehicles that travel in the same traveling direction as the vehicle is equal to or larger than a predetermined ratio. In the state as illustrated in FIG. 2, the notification control unit 26 gives a notice of recommendation for switching to the autonomous driving if the ratio of autonomous driving in the different vehicles VA to VF that travel in the same traveling direction is equal to or larger than the predetermined ratio.

The notification control unit 26 may give a notice of recommendation for switching to the autonomous driving if the ratio of autonomous driving in the different vehicles that travel in front of the vehicle in the same traveling direction as the vehicle is equal to or larger than a predetermined ratio. In the state as illustrated in FIG. 2, the notification control unit 26 gives a notice of recommendation for switching to the autonomous driving if the ratio of autonomous driving in the different vehicles VA to VD is equal to or larger than the predetermined ratio.

The notification control unit 26 may give a notice of recommendation for switching to the autonomous driving if the ratio of autonomous driving in the different vehicles that travel in the same traveling direction as the vehicle is equal to or larger than the predetermined ratio and if a different vehicle that travels just ahead of the vehicle or a different vehicle that travels just behind the vehicle is performing autonomous driving.

The predetermined ratio is, for example, 50% to 100%. The predetermined ratio may be changed depending on a road type of the traveling road of the vehicle. For example, if the traveling road of the vehicle is an expressway, the predetermined ratio may be reduced as compared to other roads. Alternatively, the predetermined ratio may be changed depending on a vehicle speed of the vehicle. For example, if the vehicle speed of the vehicle is equal to or larger than a predetermined speed, the predetermined ratio may be reduced as compared to a case in which the vehicle speed is smaller than the predetermined speed.

If the ratio of autonomous driving in the different vehicles on the traveling road of the vehicle is high, it is easy to maintain an appropriate inter-vehicle distance between the vehicle and the different vehicles that are performing autonomous driving and maintain a constant vehicle speed. Therefore, it becomes possible to maintain a high level of safety on the entire traveling road by switching to the autonomous driving. Therefore, if the ratio of autonomous driving in the different vehicles is equal to or larger than the predetermined ratio, it is preferable to give a notice of recommendation for switching to the autonomous driving to the driver.

Further, if the ratio of autonomous driving in the different vehicles on the traveling road of the vehicle is low, a ratio that the different vehicles that are not performing autonomous driving behave in an unpredictable manner increases. Therefore, it is possible to maintain a high level of safety on the entire traveling road by allowing the driver to perform driving without switching to the autonomous driving. Therefore, if the ratio of autonomous driving in the different vehicles is not equal to or larger than the predetermined ratio, it is preferable to allow the driver to continue to drive without giving a notice of recommendation for switching to the autonomous driving. Alternatively, it may be possible to give a notice indicating that switching to the autonomous driving is not recommended.

The display control unit 27, when the notification control unit 26 gives a notice, generates a video signal corresponding to contents of the notice, and outputs the video signal to the display unit 13. For example, when the notification control unit 26 gives a notice, the display control unit 27 generates a video signal for giving a notice indicating that "a ratio of autonomous driving vehicles among different vehicles is XX %", and outputs the video signal to the display unit 13. For example, when the notification control unit 26 gives a notice, the display control unit 27 generates a video signal for giving a notice indicating that "switching to autonomous driving is recommended", and outputs the video signal to the display unit 13.

The voice output control unit 28, when the notification control unit 26 gives a notice, generates a voice signal corresponding to contents of the notice, and outputs the voice signal to the voice output unit 14. For example, when the notification control unit 26 gives a notice, the voice output control unit 28 generates a voice signal for giving a notice indicating that "a ratio of autonomous driving vehicles among different vehicles is XX %", and outputs the voice signal to the voice output unit 14 For example, when the notification control unit 26 gives a notice, the voice output control unit 28 generates a voice signal for giving a notice indicating that "switching to autonomous driving is recommended", and outputs the voice signal to the voice output unit 14.

Figure 3:
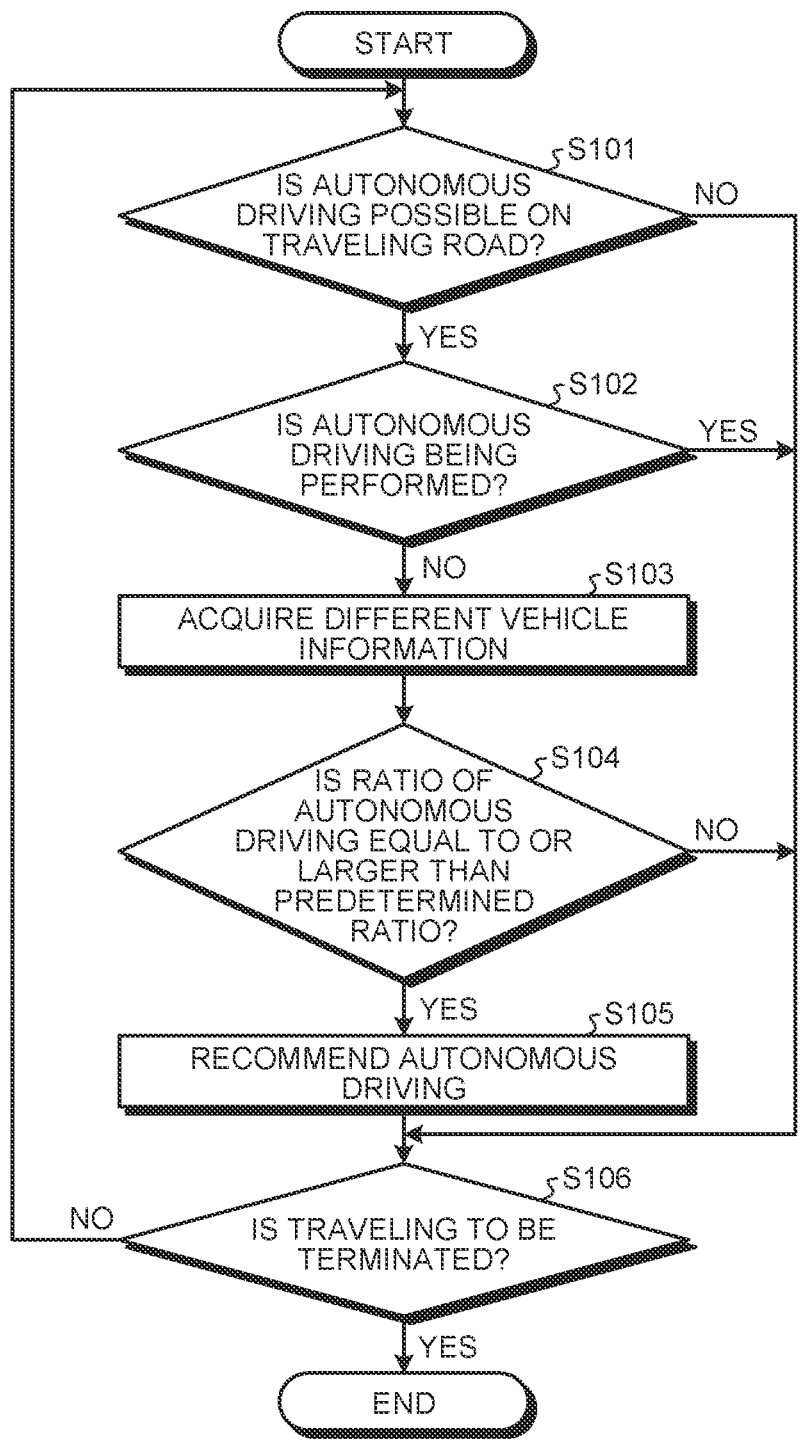
FIG. 3 is a flowchart illustrating an example of the flow of a process performed by the driving assistance device according to the first embodiment.

A flow of a process performed by the control device 20 of the driving assistance device 10 will be described below with reference to FIG. 3. FIG. 3 is a flowchart illustrating an example of the flow of a process performed by the driving assistance device according to the first embodiment.

While the driving assistance device 10 is activated, the control device 20 causes the vehicle information acquisition unit 21 to acquire location information on the vehicle V. The control device 20 causes the different vehicle information acquisition unit 23 to acquire different vehicle information on different vehicles that travel on the traveling road of the subject vehicle.

The control device 20 causes the traveling road determination unit 25 to determine whether the location information on the vehicle indicates a traveling road on which autonomous driving is possible, on the basis of the location information acquired by the vehicle information acquisition unit 21 (Step S101). If the traveling road determination unit 25 determines that the location information on the vehicle indicates a traveling road on which autonomous driving is possible (Yes at Step S101), the control device 20 proceeds to Step S102. If the traveling road determination unit 25 does not determine that the location information on the vehicle indicates a traveling road on which autonomous driving is possible (No at Step S101), the control device 20 proceeds to Step S106.

The control device 20 determines whether the vehicle is performing autonomous driving on the basis of the information which is acquired by the vehicle information acquisition unit 21 and which makes it possible to determine whether the vehicle is performing autonomous driving (Step S102). If the vehicle is performing autonomous driving (Yes at Step S102), the control device 20 proceeds to Step S106. If the vehicle is not performing autonomous driving (No at Step S102), the control device 20 proceeds to Step S103.

The control device 20 causes the different vehicle information acquisition unit 23 to acquire the different vehicle information (Step S103). More specifically, the control device 20 causes the different vehicle information acquisition unit 23 to acquire the different vehicle information on the different vehicles that travel on the traveling road of the vehicle. The control device 20 proceeds to Step S104.

The control device 20 causes the notification control unit 26 to determine whether a ratio of autonomous driving calculated by the autonomous driving ratio acquisition unit 24 is equal to or larger than a predetermined ratio (Step S104). If the ratio of autonomous driving is equal to or larger than the predetermined ratio (Yes at Step S104), the control device 20 proceeds to Step S105. If the ratio of autonomous driving is not equal to or larger than the predetermined ratio (No at Step S104), the control device 20 proceeds to Step S106.

The control device 20 recommends switching to autonomous driving (Step S105). More specifically, the control device 20 causes the display control unit 27 to generate a video signal for giving a notice indicating that "switching to autonomous driving is recommended", and outputs the video signal to the display unit 13. Further, the control device 20 causes the voice output control unit 28 to generate a voice signal for giving a notice indicating that "switching to autonomous driving is recommended", and outputs the voice signal to the voice output unit 14. The driver is able to confirm that switching to autonomous driving is appropriate in the surrounding situation, by viewing display on the display unit 13 or hearing a voice output from the voice output unit 14. The driver is able to select whether to switch to autonomous driving or to continue driver's operation without performing switching, on the basis of contents of the notice. The control device 20 proceeds to Step S106.

The control device 20 determines whether to terminate traveling (Step S106). The control device 20 determines whether a termination trigger for terminating the traveling is present. For example, termination of operation of the vehicle may be used as the termination trigger. For example, a combination of turning off of engine, gear shifting to parking, operation on a parking brake, and the like may be used as the termination trigger. If the control device 20 determines that the termination trigger is present, the control device 20 determines that the traveling is to be terminated (Yes at Step S106), and terminates the process. If the control device 20 does not determine that the termination trigger is present, the control device 20 determines that the traveling is not to be terminated (No at Step S106), and performs the process at Step S101 again.

Figure 4:
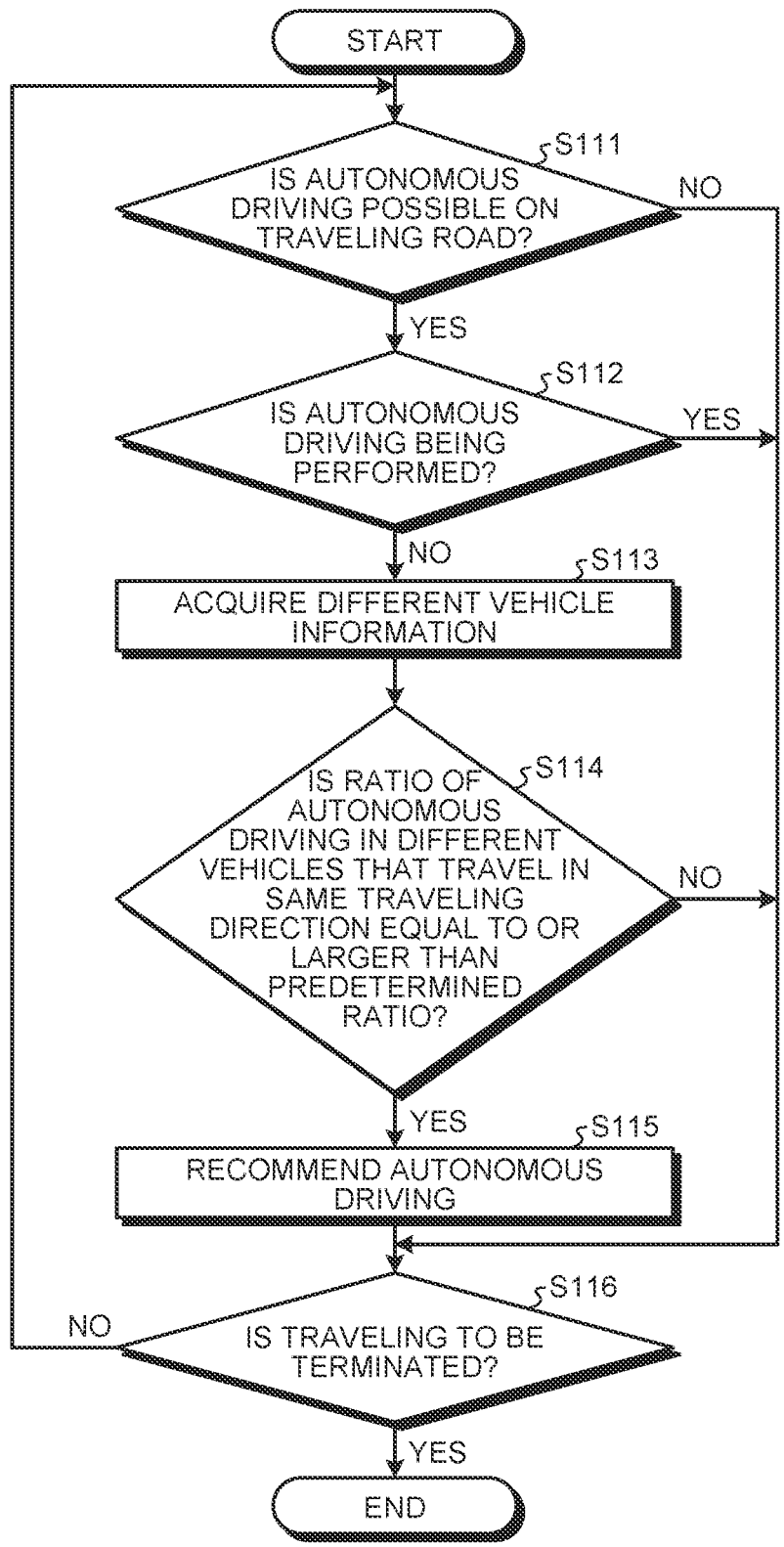
FIG. 4 is a flowchart illustrating another example of the flow of a process performed by the driving assistance device according to the first embodiment.

Another example of the flow of the process performed by the control device 20 of the driving assistance device 10 will be described below with reference to FIG. 4. FIG. 4 is a flowchart illustrating another example of the process performed by the driving assistance device according to the first embodiment. Processes from Step S111 to Step S113, Step S115, and Step S116 are the same as the processes from Step S101 to Step S103, Step S105, and Step S106.

The control device 20 causes the notification control unit 26 to determine whether a ratio of autonomous driving in different vehicles that travel in the same traveling direction as the vehicle is equal to or larger than a predetermined ratio (Step S114). If the ratio of autonomous driving in the different vehicles that travel in the same traveling direction as the vehicle is equal to or larger than the predetermined ratio (Yes at Step S114), the control device 20 proceeds to Step S115. If the ratio of autonomous driving in the different vehicles that travel in the same traveling direction as the vehicle is not equal to or larger than the predetermined ratio (No at Step S114), the control device 20 proceeds to Step S116.

Figure 5:
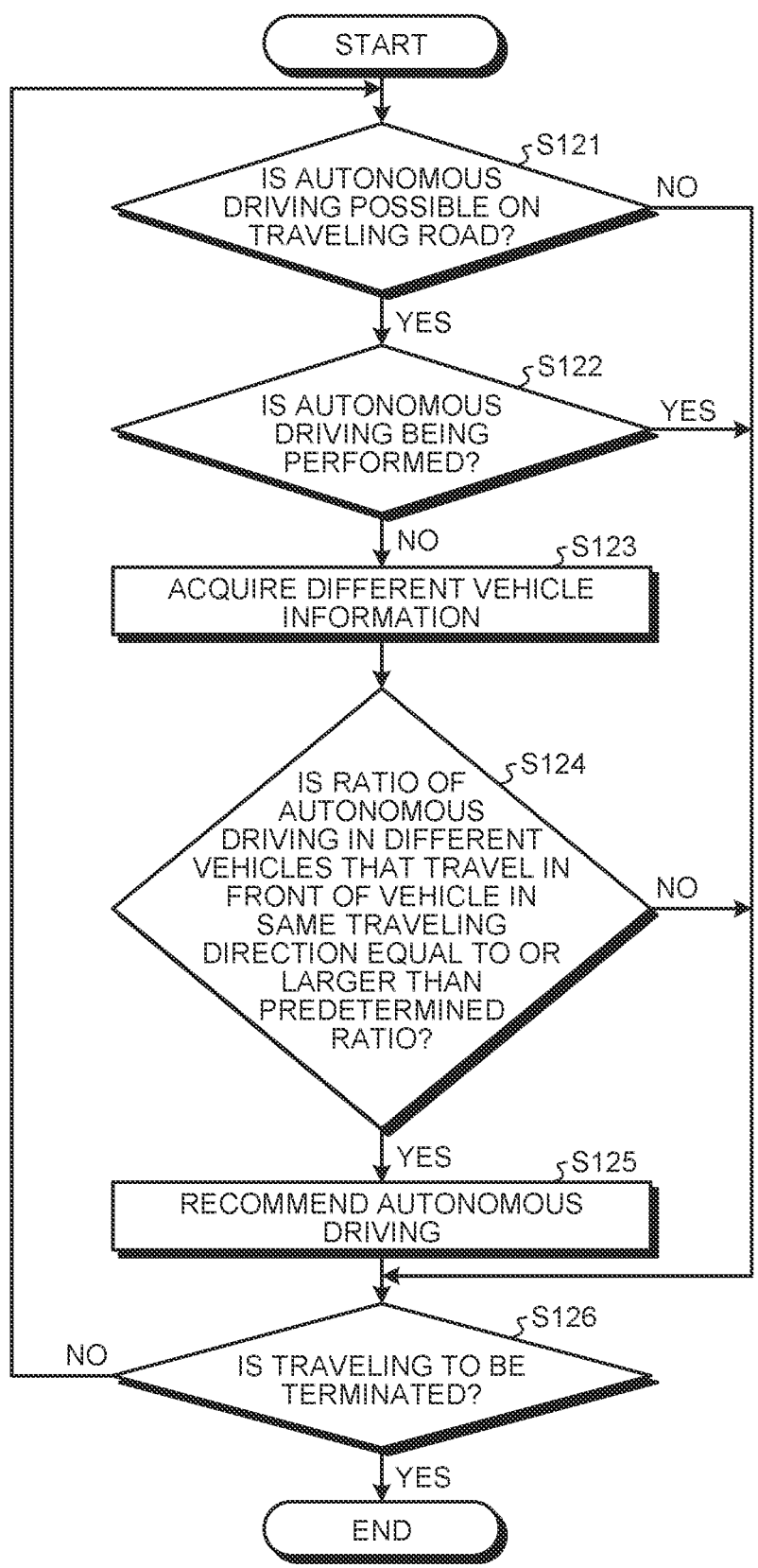
FIG. 5 is a flowchart illustrating still another example of the flow of a process performed by the driving assistance device according to the first embodiment.

A still another example of the flow of the process performed by the control device 20 of the driving assistance device 10 will be described below with reference to FIG. 5. FIG. 5 is a flowchart illustrating still another example of the process performed by the driving assistance device according to the first embodiment. Processes from Step S121 to Step S123, Step S125, and Step S126 are the same as the processes from Step S101 to Step S103, Step S105, and Step S106.

The control device 20 causes the notification control unit 26 to determine whether a ratio of autonomous driving in different vehicles that travel in front of the vehicle in the same traveling direction as the vehicle is equal to or larger than a predetermined ratio (Step S124). If the ratio of autonomous driving in the different vehicles that travel in front of the vehicle in the same traveling direction as the vehicle is equal to or larger than the predetermined ratio (Yes at Step S124), the control device 20 proceeds to Step S125. If the ratio of autonomous driving in the different vehicles that travel in front of the vehicle in the same traveling direction as the vehicle is not equal to or larger than the predetermined ratio (No at Step S124), the control device 20 proceeds to Step S126.

In this manner, if the ratio of autonomous driving in the different vehicles that travel on the traveling road of the vehicle is equal to or larger than the predetermined ratio, a recommendation for autonomous driving is given.

As described above, according to the present embodiment, if the ratio of autonomous driving in the different vehicles that travel on the traveling road of the vehicle is equal to or larger than the predetermined ratio, it is possible to give a recommendation for autonomous driving. If the ratio of autonomous driving in the different vehicles that travel on the traveling road of the vehicle is equal to or larger than the predetermined ratio, by performing autonomous driving, it is possible to easily adjust acceleration, deceleration, and a stop timing in synchronization with vehicles located nearby, so that it is possible to improve safety. In contrast, when the ratio of autonomous driving in the different vehicles that travel on the traveling road of the vehicle is equal to or larger than the predetermined ratio, and if a driver performs operation without performing autonomous driving, it may become difficult to adjust acceleration, deceleration, and a stop timing in synchronization with vehicles located nearby, so that safety may be reduced. In this manner, according to the present embodiment, it is possible to assist the driver in making an appropriate determination on switching between autonomous driving and driving performed by the driver.

According to the present embodiment, if the ratio of autonomous driving in the different vehicles that travel in the same traveling direction as the vehicle is equal to or larger than the predetermined ratio, it is possible to give a recommendation for autonomous driving.

According to the present embodiment, if the ratio of autonomous driving in the different vehicles that travel in front of the vehicle in the same traveling direction as the vehicle is equal to or larger than the predetermined ratio, it is possible to give a recommendation for autonomous driving.

Furthermore, according to the present embodiment, the driver is able to switch to autonomous driving by viewing display on the display unit 13 or hearing a voice output from the voice output unit 14, so that it is possible to confirm that autonomous driving is recommended in the surrounding situation. Moreover, the driver is able to appropriately determine whether to switch to autonomous driving or to continue driver's operation without performing switching.

Second Embodiment

Figure 6:
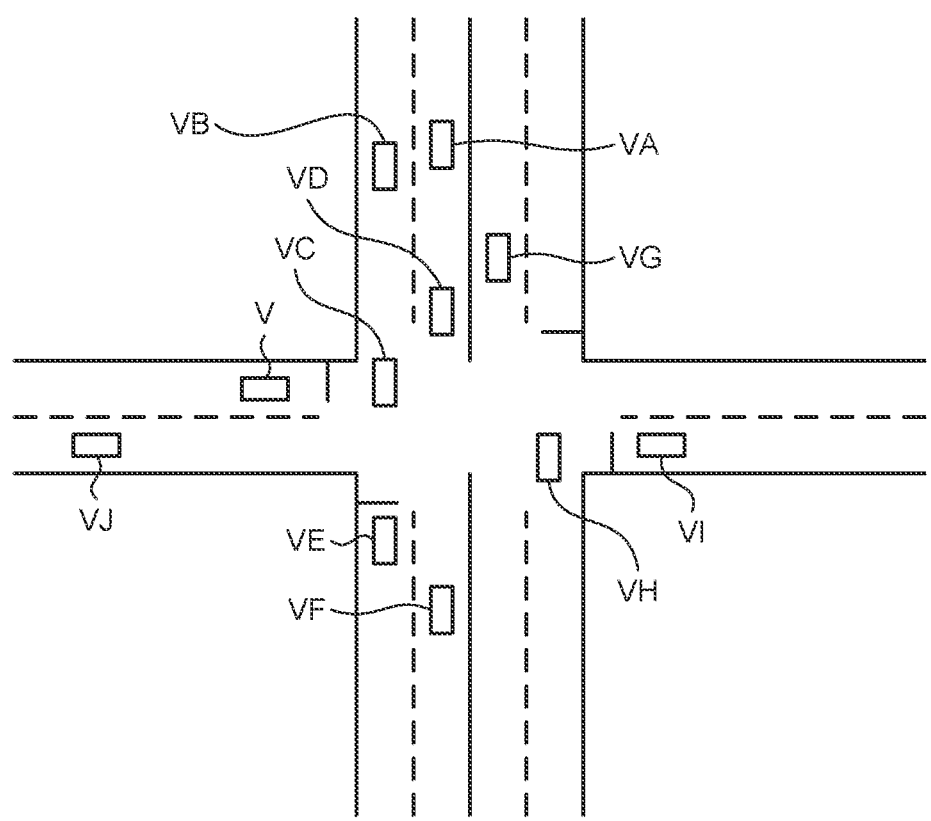
FIG. 6 is a diagram for explaining a vehicle and different vehicles.
Figure 7:
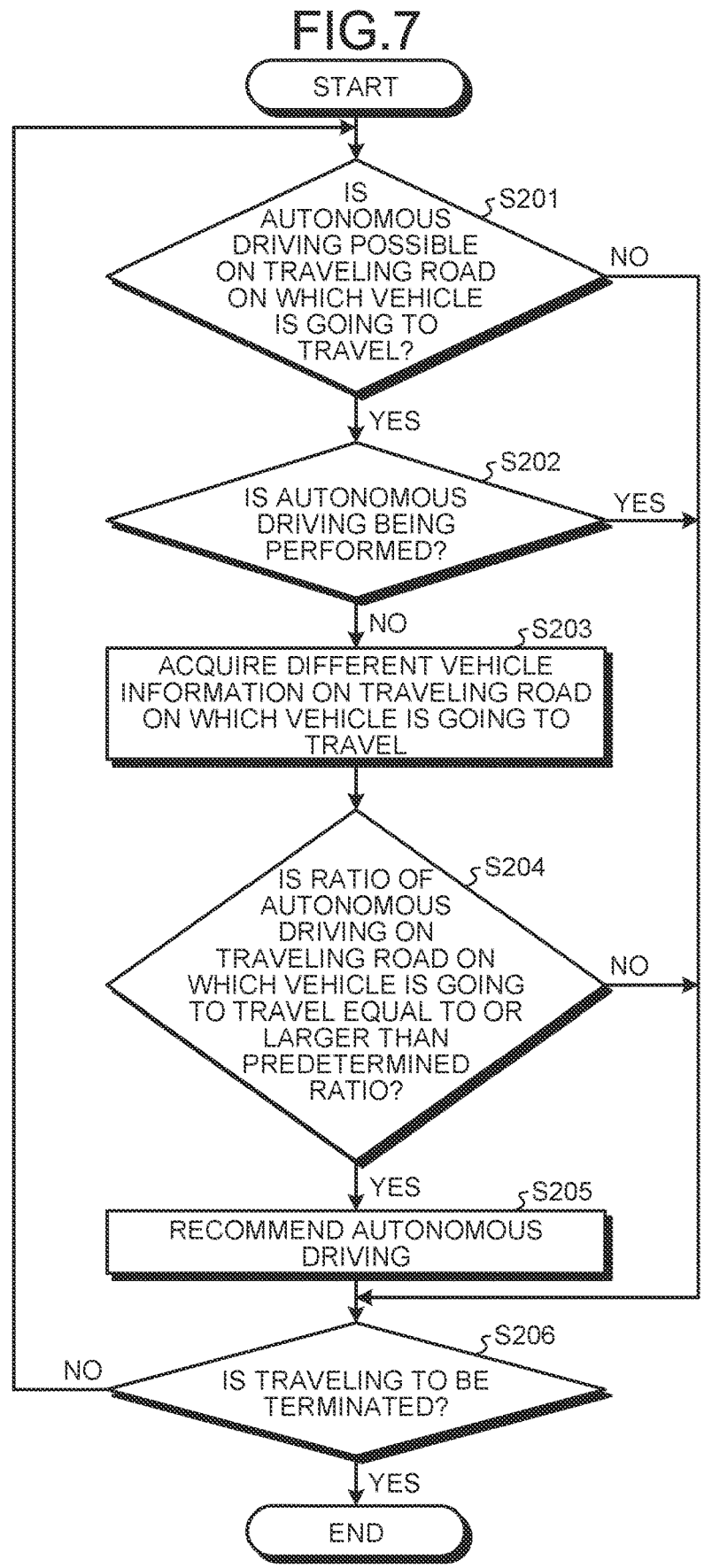
FIG. 7 is a flowchart illustrating an example of the flow of a process performed by a driving assistance device according to a second embodiment.

A driving assistance device 10 according to a second embodiment will be described with reference to FIG. 6 and FIG. 7. FIG. 6 is a diagram for explaining a vehicle and different vehicles. FIG. 7 is a flowchart illustrating an example of the flow of a process performed by the driving assistance device according to the second embodiment. A basic configuration of the driving assistance device 10 is the same as that of the driving assistance device 10 of the first embodiment.

The vehicle and the different vehicles will be described with reference to FIG. 6. An example will be described in which the vehicle V is going to turn to the left at an intersection, on the basis of FIG. 6. On a traveling road on which the vehicle is going to travel, different vehicles VA to VD and a different vehicle VG are traveling. The different vehicles VA to VD are traveling in the same traveling direction as a direction in which the vehicle is going to travel. The different vehicle VG is traveling in an opposite direction in an opposite lane of a lane in which the vehicle is going to travel.

The vehicle information acquisition unit 21 is able to acquire information on whether autonomous driving is possible on a traveling road on which the vehicle is going to travel, on the basis of information that is acquired from a navigation system, for example. The traveling road on which the vehicle is going to travel is identified by, for example, a traveling route that is set based on a destination or the like set in the navigation system. Further, even if the traveling route is not set, the traveling road on which the vehicle is going to travel may be identified based on a traveling road located ahead of a point at which the vehicle is traveling.

The traveling road determination unit 25 determines whether autonomous driving is possible on the traveling road on which the vehicle is going to travel, on the basis of the information acquired by the vehicle information acquisition unit 21.

The different vehicle information acquisition unit 23 acquires the autonomous driving information on different vehicles on the traveling road on which the vehicle is going to travel. In the example in FIG. 6, the different vehicle information acquisition unit 23 acquires the autonomous driving information on the different vehicles on the traveling road to which the vehicle is going to move by turning to the left at the intersection.

The autonomous driving ratio acquisition unit 24 acquires a ratio of autonomous driving performed in different vehicles on the traveling road on which the vehicle is going to travel. In the example in FIG. 6, the autonomous driving ratio acquisition unit 24 acquires the ratio of autonomous driving performed in the different vehicles on the traveling road to which the vehicle is going to move by turning to the left at the intersection.

If the ratio of autonomous driving in the different vehicles on the traveling road on which the vehicle is going to travel is equal to or larger than a predetermined ratio, the notification control unit 26 may provide information for supporting determination on switching between autonomous driving and driving that requires operation by the driver, at the start of traveling on the traveling road on which the vehicle is going to travel. In the state as illustrated in FIG. 6, for example, if the ratio of autonomous driving in the different vehicles VA to VD and the different vehicle VG is equal to or larger than the predetermined ratio, a notice of recommendation for switching to autonomous driving is given just before the vehicle turns to the left or just after the vehicles turns to the left.

Another example of the flow of the process performed by the control device 20 of the driving assistance device 10 will be described below with reference to FIG. 7. Processes at Step S202, Step S205, and Step S206 are the same as the processes at Step S102, Step S105, and Step S106.

The control device 20 causes the traveling road determination unit 25 to determine whether a traveling road on which the vehicle is going to travel is a traveling road on which autonomous driving is possible, on the basis of the location information acquired by the vehicle information acquisition unit 21 (Step S201). If the control device 20 determines that the traveling road on which the vehicle is going to travel is a traveling road on which the autonomous driving is possible (Yes at Step S201), the control device 20 proceeds to Step S202. If the control device 20 does not determine that the traveling road on which the vehicle is going to travel is a traveling road on which the autonomous driving is possible (No at Step S201), the control device 20 proceeds to Step S206.

The control device 20 causes the different vehicle information acquisition unit 23 to acquire different vehicle information on different vehicles that travel on the traveling road on which the vehicle is going to travel (Step S203). The control device 20 proceeds to Step S204.

The control device 20 causes the notification control unit 26 to determine whether a ratio of autonomous driving in the different vehicles on the traveling road on which the vehicle is going to travel, where the ratio is calculated by the autonomous driving ratio acquisition unit 24, is equal to or larger than the predetermined ratio (Step S204). If the ratio of autonomous driving in the different vehicles on the traveling road on which the vehicle is going to travel is equal to or larger than the predetermined ratio (Yes at Step S204), the control device 20 proceeds to Step S205. If the ratio of autonomous driving in the different vehicles on the traveling road on which the vehicle is going to travel is not equal to or larger than the predetermined ratio (No at Step S204), the control device 20 proceeds to Step S206.

In this manner, if the ratio of autonomous driving in the different vehicles on the traveling road on which the vehicle is going to travel is equal to or larger than the predetermined ratio, a recommendation for switching to autonomous driving is given.

As described above, according to the present embodiment, if the ratio of autonomous driving in the different vehicles on the traveling road on which the vehicle is going to travel is equal to or larger than the predetermined ratio, it is possible to give a recommendation for switching to autonomous driving. According to the present embodiment, for example, it is possible to assist the driver to determine, in advance, whether it is better to perform autonomous driving or to perform driver's operation without performing autonomous driving, just before the vehicle turns to the right or left or just after the vehicle turns to the right or left. Furthermore, as another example, before the vehicle enters an expressway on which the vehicle is going to travel, if a ratio of autonomous driving in different vehicles that are traveling on the expressway is equal to or larger than a predetermined ratio, it is possible to give a recommendation for autonomous driving.

Third Embodiment

Figure 8:
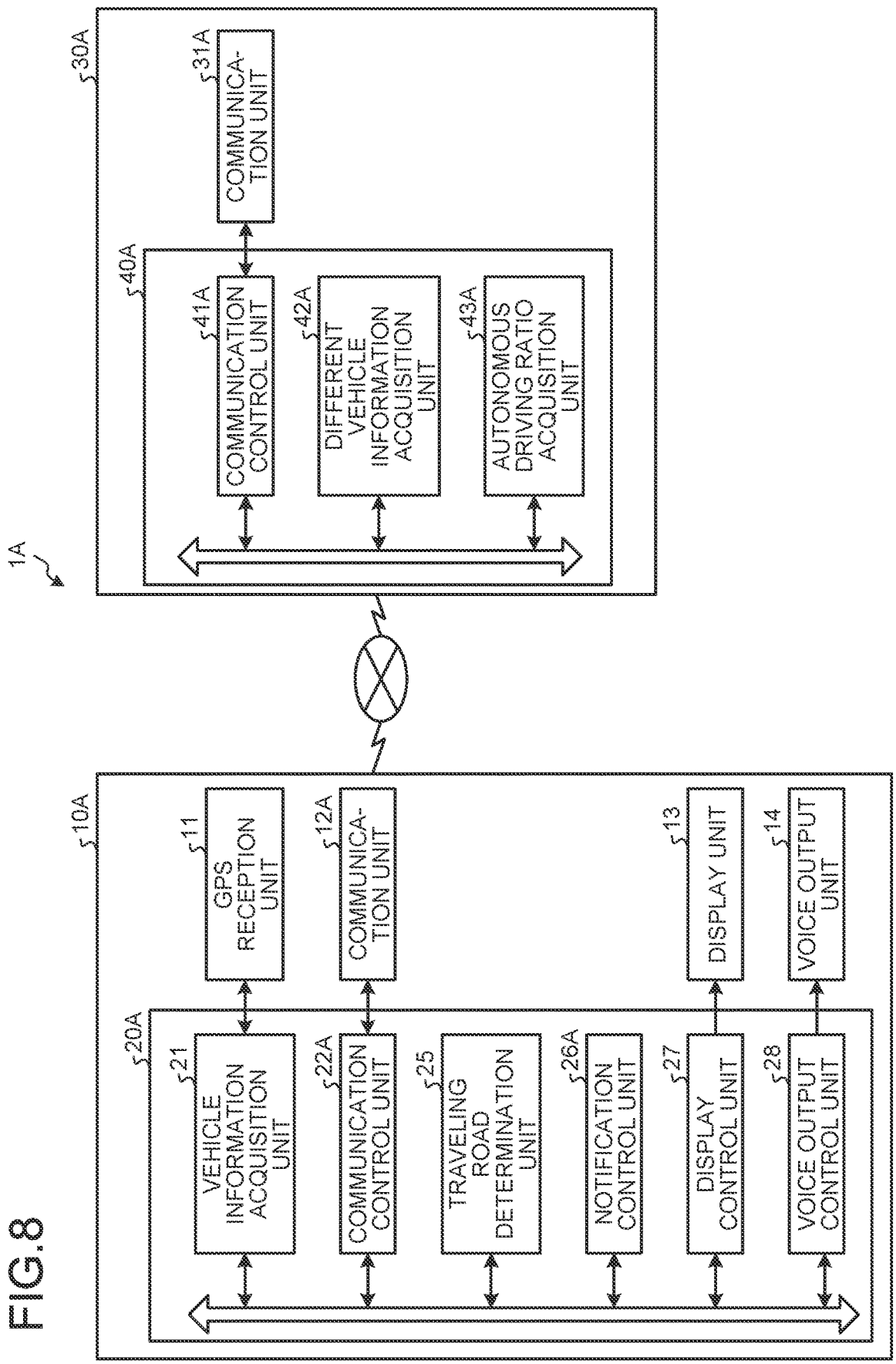
FIG. 8 is a block diagram illustrating a configuration example of a driving assistance system according to a third embodiment.

A driving assistance system 1A according to a third embodiment will be described with reference to FIG. 8. FIG. 8 is a block diagram illustrating a configuration example of the driving assistance system according to the third embodiment. The driving assistance system 1A includes a driving assistance device 10A that is used in a vehicle capable of switching between autonomous driving and driving that requires operation by a driver, and an external device 30A capable of performing communication with the driving assistance device 10A. The driving assistance system 1A is different from the first embodiment in that the external device 30A acquires information on different vehicles and acquires a ratio of autonomous driving performed in the different vehicles.

The driving assistance device 10A includes the GPS reception unit 11, a communication unit 12A, the display unit 13, the voice output unit 14, and a control device 20A among the functions included in the driving assistance device 10 of the first embodiment. The control device 20A includes the vehicle information acquisition unit 21, a communication control unit 22A, the traveling road determination unit 25, a notification control unit 26A, the display control unit 27, and the voice output control unit 28 among the functions included in the control device 20 of the first embodiment.

The communication unit 12A is able to perform communication with the external device 30A. The communication unit 12A is able to acquire, from the external device 30A, a ratio of autonomous driving performed in different vehicles.

The communication control unit 22A controls communication performed by the communication unit 12A.

The notification control unit 26A performs control on whether to provide information for supporting determination on appropriateness of switching between autonomous driving and driving that requires operation by the driver, on the basis of the ratio of autonomous driving in the different vehicles, where the ratio is acquired from the external device 30A via the communication unit 12A.

The external device 30A includes a communication unit 31A and a control device 40A. The external device 30A is, for example, a device that is used by a business operator who provides information on a recommendation for autonomous driving. The control device 40A includes a communication control unit 41A, a different vehicle information acquisition unit 42A corresponding to the different vehicle information acquisition unit 23 of the control device 20 of the first embodiment, and an autonomous driving ratio acquisition unit 43A corresponding to the autonomous driving ratio acquisition unit 24.

The communication unit 31A is able to perform communication with the driving assistance device 10A and different vehicles (not illustrated). The communication unit 31A is able to acquired information from the different vehicles. The communication unit 31A is able to transmit the ratio of autonomous driving performed in the different vehicles acquired by the autonomous driving ratio acquisition unit 43A to the driving assistance device 10A.

The communication control unit 41A controls communication performed by the communication unit 31A.

The different vehicle information acquisition unit 42A acquires autonomous driving information on the different vehicles based on the location information on the vehicle, via the communication unit 31A.

The autonomous driving ratio acquisition unit 43A acquires the ratio of autonomous driving performed in the different vehicles from the autonomous driving information on the different vehicles acquired by the different vehicle information acquisition unit 42A. For example, the autonomous driving ratio acquisition unit 43A acquires a ratio of different vehicles that are performing autonomous driving among different vehicles that are located within a radius of 100 meters from the vehicle.

As described above, according to the present embodiment, if the ratio of autonomous driving in the different vehicles that travel on the traveling road of the vehicle is equal to or larger than the predetermined ratio via the external device 30A, it is possible to give a recommendation for autonomous driving. According to the present embodiment, it is possible to perform centralized management on a recommendation of autonomous driving in a wide range by using the external device 30A, instead of using vehicle-to-vehicle communication. Therefore, it is possible to recommend autonomous driving that is optimized in a wide range, rather than recommendation of autonomous driving based on partial determination made by a specific vehicle, so that it is possible to assist the driver in making an appropriate determination on switching between autonomous driving and driving performed by the driver.

While the driving assistance device 10 and the driving assistance system 1A according to the embodiments have been described above, embodiments may be made in various different modes other than the embodiments as described above.

Each of the structural elements of the driving assistance device 10 and the driving assistance system 1A illustrated in the drawings are functionally conceptual and do not necessarily have to be physically configured in the manner illustrated in the drawings. In other words, specific forms of each of the devices are not limited to those illustrated in the drawings, and all or part of the devices may be functionally or physically distributed or integrated in arbitrary units depending on various loads or use conditions.

The configurations of the driving assistance device 10 and the driving assistance system 1A are implemented as software by, for example, a program or the like loaded on a memory. In the embodiments as described above, it has been explained that the functional blocks are implemented by cooperation with hardware or software. In other words, the functional blocks are implemented in various forms using only hardware, using only software, or using a combination of hardware and software.

The structural elements described above include one that can easily be thought of by a person skilled in the art and one that is practically identical. Further, the configurations described above may be combined appropriately. Furthermore, within the scope not departing from the gist of the present disclosure, various omission, replacement, and modifications of the components may be made.

The driving assistance device 10 need not always include the traveling road determination unit 25. In this case, it is sufficient to perform the processes from Step S102 to Step S106, without performing the process at Step S101 in the flowchart illustrated in FIG. 3.

The notification control unit 26 may perform control on whether to provide information for supporting determination on appropriateness of switching between autonomous driving and driving that requires operation by the driver, on the basis of a ratio of autonomous driving in different vehicles that travel in the vicinity of the vehicle, such as on the lateral side, instead of different vehicles in front of the vehicle in the same traveling direction as the vehicle. With this configuration, it is possible to more appropriately provide information for supporting determination on appropriateness of switching between autonomous driving and driving that requires operation by the driver.

Furthermore, if a different vehicle that travels just behind the vehicle in the same traveling direction as the vehicle is performing autonomous driving, the notification control unit 26 may give a notice of recommendation for autonomous driving. If the different vehicle that travels just behind the vehicle in the same traveling direction as the vehicle is a vehicle that is performing autonomous driving, it is presumed that tailgating is less likely to be performed, so that it is possible to presume that there is no problem even if autonomous driving is performed.

INDUSTRIAL APPLICABILITY

The driving assistance device, the driving assistance system, the driving assistance method, and the program according to the embodiments may be used in a driving assistance device of a vehicle capable of switching between autonomous driving and driving that requires operation by a driver, for example.

According to the embodiments, it is possible to assist a driver in making an appropriate determination on switching between autonomous driving and driving that requires operation by the driver.

What is claimed is:

1. A driving assistance device that is used in a vehicle capable of switching between autonomous driving and driving that requires operation by a driver, the driving assistance device comprising:
    a different vehicle information acquisition unit that acquires autonomous driving information on different vehicles that travel on a traveling road on which the vehicle is going to travel;
    an autonomous driving ratio acquisition unit that acquires a ratio of autonomous driving among the different vehicles on the traveling road on which the vehicle is going to travel, from the autonomous driving information on the different vehicles acquired by the different vehicle information acquisition unit; and
    a notification control unit that provides information for supporting determination on switching between autonomous driving and driving that requires operation by a driver, in accordance with the ratio of autonomous driving among the different vehicles, wherein
    the notification control unit is configured to give a notice of recommendation for switching to the autonomous driving if the ratio of autonomous driving is equal to or larger than a predetermined ratio, and
    the predetermined ratio is changed depending on a road type of the traveling road of the vehicle.

2. The driving assistance device according to claim 1, wherein
    if the ratio of autonomous driving among the different vehicles on the traveling road on which the vehicle is going to travel is equal to or larger than the predetermined ratio, the notification control unit provides the information for supporting determination on switching between autonomous driving and driving that requires operation by a driver at the start of travelling on the traveling road on which the vehicle is going to travel.

3. The driving assistance device according to claim 1, further comprising:
    a traveling road determination unit that determines whether a target traveling road for which the autonomous driving information is to be acquired is a traveling road on which the vehicle is able to perform autonomous driving, wherein
    the notification control unit recommends switching to autonomous driving if the target traveling road is a traveling road on which the vehicle is able to perform autonomous driving.

4. The driving assistance device according to claim 1, wherein the autonomous driving ratio acquisition unit acquires a ratio of autonomous driving among different vehicles that travel in the same traveling direction as the vehicle, and the notification control unit recommends switching to autonomous driving if the ratio of autonomous driving among the different vehicles that travel in the same traveling direction as the vehicle is equal to or larger than a predetermined ratio.

5. A driving assistance system that comprises:

a driving assistance device that is used in a vehicle capable of switching between autonomous driving and driving that requires operation by a driver; and an external device capable of performing communication with the driving assistance device, wherein the external device comprises
- a different vehicle information acquisition unit that acquires autonomous driving information on different vehicles that travel on a traveling road on which the vehicle is going to travel on the basis of location information on the vehicle; and
- an autonomous driving ratio acquisition unit that acquires a ratio of autonomous driving among the different vehicles from the autonomous driving information on the different vehicles acquired by the different vehicle information acquisition unit, the driving assistance device includes
- a notification control unit that provides information for supporting determination on switching between autonomous driving and driving that requires operation by a driver, in accordance with the ratio of autonomous driving among the different vehicles, the notification control unit being configured to give a notice of recommendation for switching to the autonomous driving if the ratio of autonomous driving is equal to or larger than a predetermined ratio, and the predetermined ratio is changed depending on a road type of the traveling road of the vehicle.

6. A driving assistance method performed by a vehicle capable of switching between autonomous driving and driving that requires operation by a driver, the driving assistance method comprising:

acquiring autonomous driving information on different vehicles that travel on a traveling road on which the vehicle is going to travel;

acquiring a ratio of autonomous driving performed among the different vehicles on the traveling road on which the vehicle is going to travel, from the autonomous driving information on the different vehicles acquired at the acquiring;

providing information for supporting determination on switching between autonomous driving and driving that requires operation by the driver, in accordance with the ratio of autonomous driving among the different vehicles; and giving a notice of recommendation for switching to the autonomous driving if the ratio of autonomous driving is equal to or larger than a predetermined ratio, wherein the predetermined ratio is changed depending on a road type of the traveling road of the vehicle.

7. A non-transitory computer-readable recording medium containing a computer program to be executed by a computer that operates as a driving assistance device of a vehicle capable of switching between autonomous driving and driving that requires operation by a driver, the computer program causing the computer to execute:

acquiring autonomous driving information on different vehicles that travel on a traveling road on which the vehicle is going to travel;

acquiring a ratio of autonomous driving performed among the different vehicles on the traveling road on which the vehicle is going to travel, from the autonomous driving information on the different vehicles acquired at the acquiring;

providing information for supporting determination on switching between autonomous driving and driving that requires operation by the driver, in accordance with the ratio of autonomous driving among the different vehicles; and giving a notice of recommendation for switching to the autonomous driving if the ratio of autonomous driving is equal to or larger than a predetermined ratio, wherein the predetermined ratio is changed depending on a road type of the traveling road of the vehicle.

* * * * *